(12) United States Patent
Heckmann et al.

(10) Patent No.: US 9,428,818 B2
(45) Date of Patent: Aug. 30, 2016

(54) METHOD AND DEVICE FOR PRODUCING PIG IRON

(75) Inventors: Hado Heckmann, Linz (AT); Robert Millner, Loosdorf (AT); Gerald Rosenfellner, Ertl (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 172 days.

(21) Appl. No.: 14/348,290

(22) PCT Filed: Sep. 10, 2012

(86) PCT No.: PCT/EP2012/067610
§ 371 (c)(1),
(2), (4) Date: Mar. 28, 2014

(87) PCT Pub. No.: WO2013/045260
PCT Pub. Date: Apr. 4, 2013

(65) Prior Publication Data
US 2014/0224068 A1    Aug. 14, 2014

(30) Foreign Application Priority Data
Sep. 30, 2011  (AT) .................. A 1421/2011

(51) Int. Cl.
*C21B 13/02*  (2006.01)
*C21B 13/14*  (2006.01)
(Continued)

(52) U.S. Cl.
CPC ............. *C21B 15/00* (2013.01); *C21B 13/002* (2013.01); *C21B 13/0073* (2013.01);
(Continued)

(58) Field of Classification Search
CPC . C21B 11/02; C21B 13/004; C21B 13/0073; C21B 13/02; C21B 13/14; C21B 2100/00; C21B 2100/02; C21B 2100/04
See application file for complete search history.

(56) References Cited

U.S. PATENT DOCUMENTS 4,235,425 A * 11/1980 Beggs .................. C21B 13/002
                                                            266/147
4,358,310 A   11/1982 Sanzenbacher et al.
(Continued)

FOREIGN PATENT DOCUMENTS

CN       1449451 A     10/2003
DE    42 40 197 A1      6/1994
(Continued)

OTHER PUBLICATIONS

KR 100568352 B1 machine translation of the description published Apr. 2006.*
(Continued)

*Primary Examiner* — George Wyszomierski
*Assistant Examiner* — Tima M McGuthry Banks
(74) *Attorney, Agent, or Firm* — Ostrolenk Faber LLP

(57) ABSTRACT

A method for reducing material containing iron oxide in a solid bed in a reduction shaft and converting the material to pre-reduced material in the reduction shaft by introducing pre-reduction gas into the solid bed at a pressure p1. Pre-reduced material is introduced from the reduction shaft into a melter gasifier and there finally reduced by reduction gas under a pressure p2. A top gas at pressure p3 is diverted from above the solid bed out of the reduction shaft. A dust exhaust gas having a pressure p4 is diverted from the solid bed out of the reduction shaft. The relationships p1>p4 and p1>p3, and preferably also p4>p3, apply. A device carries out such a method.

11 Claims, 5 Drawing Sheets

(51) Int. Cl.
*C21B 15/00* (2006.01)
*C21B 13/00* (2006.01)

(52) U.S. Cl.
CPC .............. *C21B 13/02* (2013.01); *C21B 13/14* (2013.01); *C21B 2100/00* (2013.01); *C21B 2100/02* (2013.01); *Y02P 10/122* (2015.11); *Y02P 10/128* (2015.11)

(56) References Cited

U.S. PATENT DOCUMENTS

| | | | |
|---|---|---|---|
| 5,647,887 A | 7/1997 | Meissner | |
| 5,669,955 A | 9/1997 | Vuletic et al. | |
| 5,948,139 A | 9/1999 | Kepplinger et al. | |
| 6,224,647 B1 * | 5/2001 | Vuletic | C21B 13/002 266/160 |
| 6,224,649 B1 | 5/2001 | Villarreal-Trevino | |
| 6,231,638 B1 | 5/2001 | Janz et al. | |
| 6,264,725 B1 | 7/2001 | Stockinger et al. | |
| 6,416,566 B1 | 7/2002 | Kepplinger et al. | |
| 6,960,238 B2 | 11/2005 | Kepplinger et al. | |

FOREIGN PATENT DOCUMENTS

| | | |
|---|---|---|
| DE | 196 23 246 C1 | 10/1997 |
| EP | 1013778 A1 | 6/2000 |
| JP | 2000171173 A | 6/2000 |
| KR | 100568352 B1 * | 4/2006 |
| WO | WO 97/04137 A1 | 2/1997 |
| WO | WO 98/02586 A1 | 1/1998 |
| WO | WO 98/15661 A1 | 4/1998 |
| WO | WO 00/01856 A1 | 1/2000 |

OTHER PUBLICATIONS

International Search Report dated May 8, 2013 issued in corresponding International patent application No. PCT/EP2012/067610.

* cited by examiner

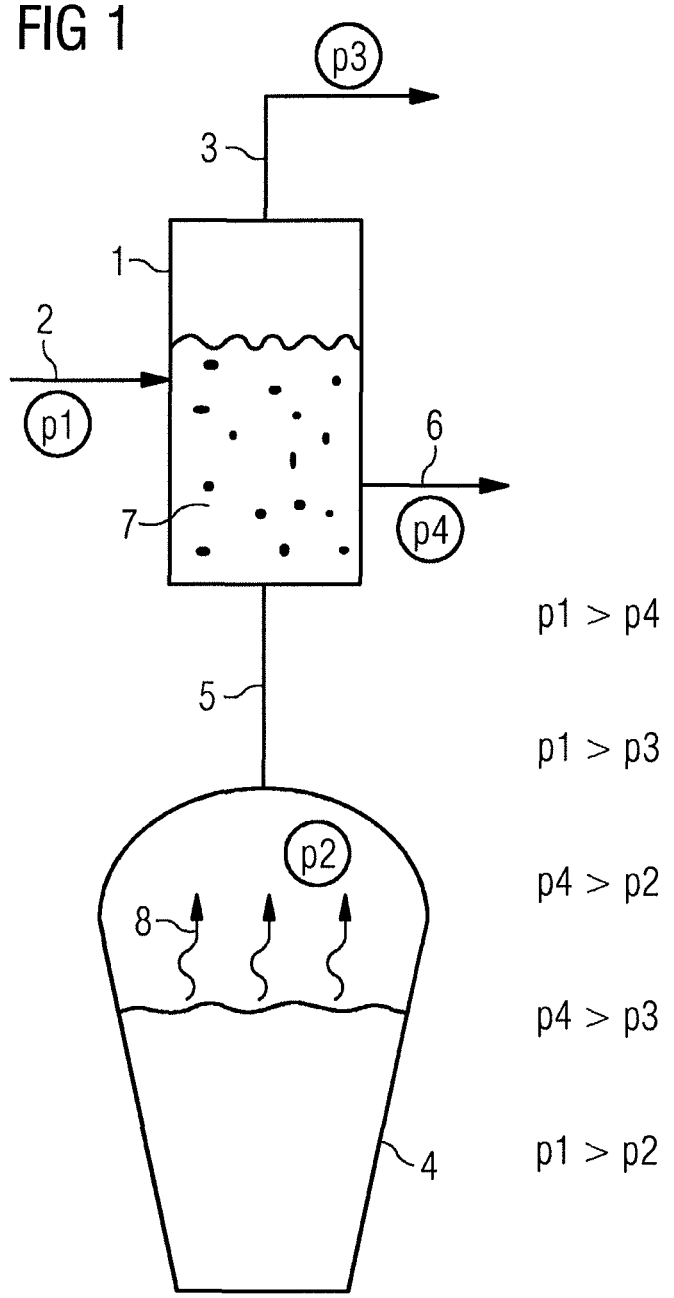

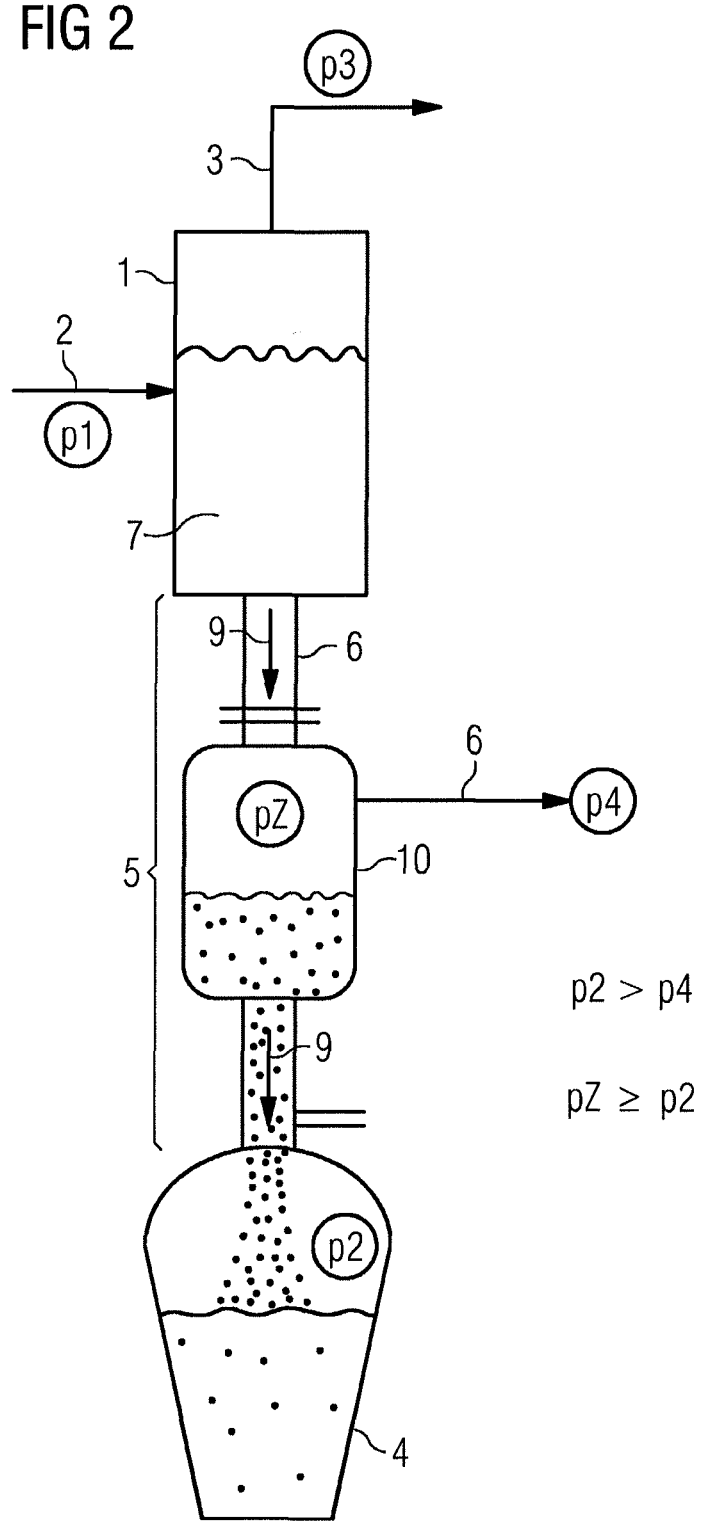

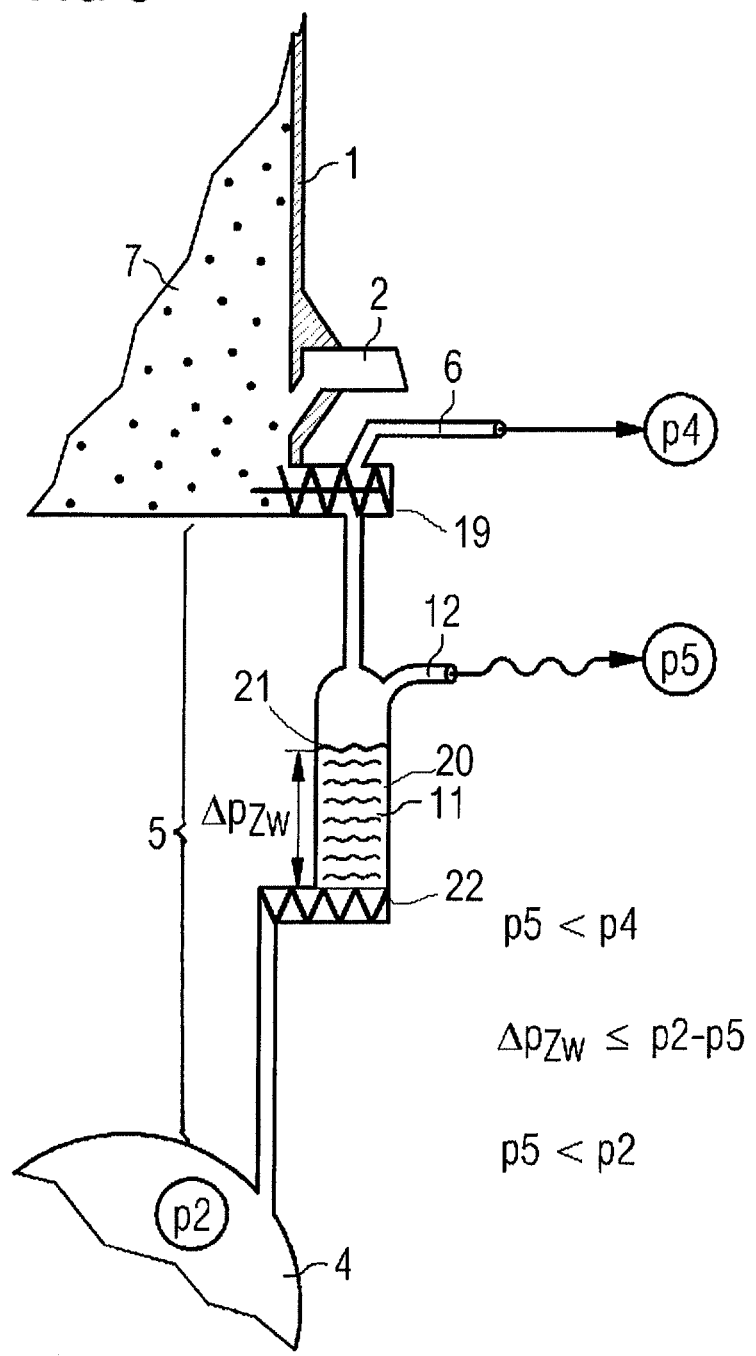

METHOD AND DEVICE FOR PRODUCING PIG IRON

CROSS-REFERENCE TO RELATED APPLICATIONS

The present application is a 35 U.S.C. §§371 national phase conversion of PCT/EP2012/067610, filed Sep. 10, 2012, which claims priority of Austrian Patent Application No. A1421/2011, filed Sep. 30, 2011, the contents of which are incorporated by reference herein. The PCT International Application was published in the German language.

FIELD OF TECHNOLOGY

The invention relates to a method for reducing material containing iron oxide, wherein material forms a solid bed in a reduction shaft and is converted to pre-reduced material in the reduction shaft by means of at least one pre-reduction gas introduced into the solid bed at a pressure p1. At least one part of the pre-reduced material, preferably the entire pre-reduced material, is introduced from the reduction shaft into a melter gasifier in which it is finally reduced by means of a reduction gas under a pressure p2. The invention also relates to a device for carrying out such a method.

PRIOR ART

Methods for reducing material containing iron oxide exist in which a pre-reduction gas is applied to a solid bed with material containing iron oxide in a reduction shaft, the gas passes through the bed and converts the bed to pre-reduced material. The pre-reduced material is then introduced into a melter gasifier in which a reduction gas effects further reduction. When it has passed through the solid bed, the used pre-reduction gas is diverted out of the chamber above the solid bed out of the reduction shaft as top gas. One example of a method of this kind is the COREX® method.

Dust-like material, also known as dust for short, is understood to be particles with a particle diameter of up to about 500 μm. One problem with a method of this kind is that dust-like material is entrained into or forms in the reduction shaft. The dust-like material can, for example, be entrained into the reduction shaft with the pre-reduction gas, with the material containing iron oxide, or with the Moeller feed also required for the pre-reduction and reduction reactions. Dust-like material can also form in the reduction shaft for example due to abrasion and degradation processes caused by phase transitions.

Part of the dust is torn from the solid bed by the flow of the pre-reduction gas and is diverted from the reduction shaft with the top gas. Another part of the dust is deposited by the flow of the pre-reduction gas in certain areas of the solid bed comprising material containing iron oxide and pre-reduced material. Dust deposits of this kind impede gas flows and thus cause the formation of heavily gas-exposed, less heavily gas-exposed and virtually non-gas-exposed zones in the solid bed. The less heavily a zone is exposed to pre-reduction gas, the less successful are reduction processes place therein. Accordingly, the dust influences the productivity of the reduction shaft or the degree of reduction of the pre-reduced material, which is defined as the ratio of the oxygen actually removed by reduction to the oxygen which can be removed by reduction in the material to be reduced.

Especially in the lower part, i.e. below the buffer, which introduces pre-reduction gas into the reduction shaft, of a COREX® reduction shaft, particularly significant dust deposits occur, because, on the one hand, downpipes, which are used to introduce pre-reduced material into the melter gasifier, entrain dust into the reduction shaft from the melter gasifier by gas streams flowing in the direction of the reduction shaft and, on the other hand, the gas streams flowing through the downpipes in the direction of the reduction shaft prevent dust from leaving the reduction shaft via the downpipes in the direction of the melter gasifier. The dust deposited in the lower part tends to agglomerate. Due to its content of alkalis or low-melting point alkali-containing slag phases, especially the dust introduced by the downpipes has a high tendency to agglomerate. The dust introduced into the reduction shaft via the Moeller feed and the dust formed in the reduction shaft by abrasion and/or degradation also tends to form agglomerates in particular in deposition zones where there is little movement due to the formation of extremely fine crystals of metallic iron and/or wustite and their cohesion as encouraged by the prevailing reaction conditions. If dust located in gaps in the solid bed agglomerate, the solid bed becomes compacted with the formation of material bridges. It is possible that compacted regions will form, which prevent the material from sliding toward the devices which entrain the pre-reduced material out of the reduction shaft. This prevents regular operation of the reduction shaft which has to be shut down and cleared out using mining techniques to establish regular operating conditions. Clearance work of this kind reduces productivity.

SUMMARY OF THE INVENTION

Technical Object

It is the object of the present invention to reduce or avoid the formation of dust deposits in the reduction shaft to reduce or avoid agglomeration problems.

Technical Solution

This object is achieved by a method for reducing material containing iron oxide. The material containing iron oxide forms a solid bed in a reduction shaft and that material is converted to pre-reduced material in the reduction shaft by means of at least one pre-reduction gas introduced into the solid bed at a pressure p1. At least one part of the pre-reduced material, preferably the entire pre-reduced material, is introduced from the reduction shaft into a melter gasifier in which it is finally reduced by means of a reduction gas under a pressure p2 and wherein a top gas having a pressure p3 is diverted out of the chamber above the solid bed out of the reduction shaft. At least one dust exhaust gas having a pressure p4 is diverted from the solid bed out of the reduction shaft and has the relationship p1>p4 and p1>p3, preferably also p4>p3.

In this context, "pre-reduction" should be understood as meaning a degree of reduction of more than 70%, preferably more than 80%, particularly preferably up to 90% or more, quite particularly preferably up to 95%, wherein these formulations include 90% and 95%.

In this context, "final reduction" should be understood as meaning a degree of reduction of more than 95%, preferably 98% or more, particularly preferably 99% or more. In principle, the degree of reduction after the "pre-reduction" is always less than after "final reduction", wherein, therefore, there are two reduction steps.

"Top gas" should be understood as meaning the used pre-reduction gas after it has passed through the solid bed which is diverted out of the chamber above the solid bed and out of the reduction shaft.

Advantageous Effects of the Invention

With the method according to the invention, dust is conveyed out from the reduction shaft not only by means of the top gas, but also by means of dust exhaust gas diverted from the solid bed. This reduces the amount of dust which is deposited in the solid bed and which would cause agglomeration.

Setting the ratio of the pressures p3 and p4 enables setting the ratio of the gas quantities withdrawn as top gas and as dust exhaust gas.

The withdrawal of the dust exhaust gas can be performed by specially provided devices and independently of the flow of the pre-reduced material in the direction of the melter gasifier.

According to a preferred embodiment of the method according to the invention, at least one part of the at least one dust exhaust gas, at least during a part of the path to be covered by the pre-reduced material on introduction into the melter gasifier between the reduction shaft and the melter gasifier, is guided jointly with this pre-reduced material in the direction of the melter gasifier.

When dust exhaust gas is guided jointly with the pre-reduced material in the direction of the melter gasifier, the dust is conveyed indirectly or directly together with the pre-reduced material into the melter gasifier, where it is at least partially processed to form the final products pig iron and slag. Dust blown out in some other way would have to be returned to the melter gasifier by means of a special device or used in some other way.

According to one embodiment of the method according to the invention, the relationship p4>p2 applies. Particularly when dust exhaust gas is guided jointly with pre-reduced material in the direction of the melter gasifier, the introduction of dust from the melter gasifier into the reduction shaft is avoided by reduction gas under p2.

According to another embodiment of the method according to the invention, the relationship p2>p4 applies and the pre-reduced material is brought to an intermediate gas pressure pZ in one or more steps before or while the pre-reduced material is introduced into the melter gasifier, wherein pZ≥p2 applies.

Normally, pZ=p2 on the introduction of the pre-reduced material into the melter gasifier. If a purging gas is additionally used in this case, pZ is a few mbar higher than p2.

For example, in this case, during the course of the method, the intermediate gas pressure pZ is increased from pZ≤p4 to pZ≥p2. This enables avoiding the introduction of dust from the melter gasifier into the reduction shaft by means of reduction gas under p2 when p2>p4 applies. This is because the reduction gas is prevented from flowing through the downpipes in the direction of the reduction shaft.

In this case, advantageously the pre-reduced material from the reduction shaft, which is introduced into the melter gasifier, is stored temporarily in an intermediate container before introduction into the melter gasifier, wherein in the intermediate container there is a pressure difference of $\Delta p_{zw}$ between the upper end of the material cushion formed during the temporary storage—i.e. the side of the material cushion facing the inflowing pre-reduced material—and the lower end of this material cushion—i.e. the end of the material cushion from which pre-reduced material is withdrawn in the direction of the melter gasifier 4. A dust discharge gas having a dust discharge gas-pressure p5 is withdrawn from the intermediate container, wherein p5<p4 and p5<p2 applies.

The following applies for $\Delta p_{zw}$, wherein $\Delta p_{zw}$ is smaller than/equal to (p2−p5), i.e. $\Delta p_{zw} \leq (p2-p5)$.

$\Delta p_{zw}$, ensures that no short-circuit flow occurs between the dust discharge gas discharge line drawing off the dust discharge gas and the melter gasifier which would reduce or prevent a delivery of reduction gas into the reduction reactor via the pre-reduction gas supply line 2.

When dust-laden gas, which is flowing from the melter gasifier through the intermediate container in the direction of the reduction reactor, flows through the material cushion in the intermediate container, the dust partially settles in the intermediate chambers of the material cushion. The more dust settles, the higher the $\Delta p_{zw}$ due to the rising flow resistance that the gas has to overcome in order to pass through the material cushion.

According to one embodiment, the dust discharge gas comprises the dust exhaust gas and p4=p5 applies.

According to one embodiment of the method according to the invention, the pre-reduced material is brought to the intermediate gas pressure pZ by introducing the pre-reduced material into an intermediate container with pressure lock devices or into a plurality of intermediate containers with pressure lock devices in sequence.

According to one embodiment of the method according to the invention, p1>p2 applies.

The pre-reduction gas may originate from different sources. For, example, it can originate from an external gas source. An external gas source should be understood to be a gas source with which no steps of the method according to the invention are performed for the pre-reduction of the material containing iron oxides or for the reduction of the pre-reduced material for the provision of the pre-reduction gas. For example, this external gas source can be natural gas, refinery gases, coke-oven gases or gases from coal gasification/–degasification processes.

The pre-reduction gas can also originate from internal gas sources. An internal gas source should be understood to mean a gas source with which steps of the method according to the invention are performed for the pre-reduction of the material containing iron oxides or for the reduction of the pre-reduced material for the provision of the pre-reduction gas. For example, the internal gas source can be a correspondingly prepared top gas, wherein the preparation can, for example, include dedusting, $CO_2$ removal, heating, cooling or compression. Another example is the use of the reduction gas that occurs in the melter gasifier of a COREX® method. The reduction gas withdrawn from the melter gasifier is generally referred to by the term generator gas. After corresponding preparation, such as dedusting and cooling, this generator gas can be used as pre-reduction gas in the reduction shaft of the method according to the invention. According to another variant of its use, the generator gas can be used in another reduction shaft for reduction, from which the generator gas is withdrawn when it has carried out its reduction task and, following corresponding preparation, the generator gas can be used similarly to the top gas.

It is also possible to use mixtures of external and internal gas sources as pre-reduction gas.

According to one embodiment of the method according to the invention, two or more pre-reduction gases under pressures that differ from each other are introduced into the solid bed. When two pre-reduction gases are introduced vertically directly adjacent to each other, as viewed in the horizontal direction, in each case, the respective pre-reduction gas introduced at a lower level has a higher pressure than the pre-reduction gas introduced at a higher level.

When the method is carried out in this way, the pre-reduction gas introduced at a higher level flows in the direction of the surface of the solid bed, while the pre-reduction gas introduced at a lower level flows in the opposite direction and correspondingly permits the diversion of dust exhaust gas from regions of the solid bed lying below the lowest height level of the introduction of pre-reduction gas into the reduction shaft. It is advantageous for it to be possible to introduce pre-reduction gases with a different reduction force at different places in the reduction shaft. This enables better control of the pre-reduction and hence increases productivity.

Compared to the prior art, the method according to the invention enables higher availability of the reduction shaft to be achieved, whereby the reduction shaft is correspondingly more productive and can have a smaller design. This also enables the use of previously problematic charge materials with a high dust content or a high tendency toward the formation of dust in the reduction shaft.

A further subject of the present invention is a device for carrying out a method according to the invention, the device comprising a reduction shaft,
- at least one pre-reduction gas supply line discharging into the reduction shaft,
- a top gas discharge line emerging from the reduction shaft, a melter gasifier,
- an introduction system for introducing material that is pre-reduced in the reduction shaft into the melter gasifier, and
- a dust exhaust gas discharge line emerging from the reduction shaft.

The introduction system for introducing material that is pre-reduced in the reduction shaft into the melter gasifier can, for example, comprise one or more lines, intermediate containers, pressure lock devices and metering devices for the controlled supply of the pre-reduced material from the reduction shaft into the melter gasifier. It can, for example, also comprise pneumatic conveying lines or conveyor belts or downpipes. The metering devices can, for example, be embodied in the form of conveying screws or cellular wheel sluices.

A melter gasifier should be understood to mean a device in which the introduced pre-reduced material is finally reduced and smelted by means of a reduction gas obtained by the gasification of carbon carriers with technically pure oxygen under a reduction gas pressure of 3-5 bar absolute or higher and at a reduction gas temperature of about 900 to 2400° C.—at the solid bed surface to the nozzle level for injecting the technically pure oxygen. The term melter gasifier should not be understood to mean a blast furnace.

Preferably, the introduction system for introducing material that has been pre-reduced in the reduction shaft into the melter gasifier also comprises at least one part of the dust exhaust gas discharge line. This enables dust exhaust gas to be diverted jointly with the pre-reduced material from the reduction shaft.

Preferably, the introduction system for introducing material that has been pre-reduced in the reduction shaft into the melter gasifier comprises one or more lines with one or more intermediate containers and optionally one or more pressure lock devices. The pressure lock devices can also be provided on the intermediate containers.

According to one embodiment, in this case, at least one intermediate container is provided with a dust discharge gas discharge line. In this way, dust can be discharged from an intermediate container of this kind in that gas entraining dust is withdrawn therefrom. For the purposes of this application, this gas is called dust discharge gas.

According to one embodiment, the device according to the invention comprises two or more pre-reduction gas supply lines that discharge into the reduction shaft at different height levels.

This enables two or more pre-reduction gases under pressures that differ from each other and with the same or different compositions to be introduced into the solid bed in the reduction shaft.

The present invention will now be described with reference to several schematic exemplary figures of embodiments.

BRIEF DESCRIPTION OF THE DRAWINGS

FIG. 1 shows an embodiment of a device for carrying out a method according to the invention.

FIG. 2 shows a preferred embodiment of a device for carrying out a method according to the invention.

FIG. 3 shows a further preferred embodiment of a device for carrying out a method according to the invention.

DESCRIPTION OF THE EMBODIMENTS

Figure 4A:
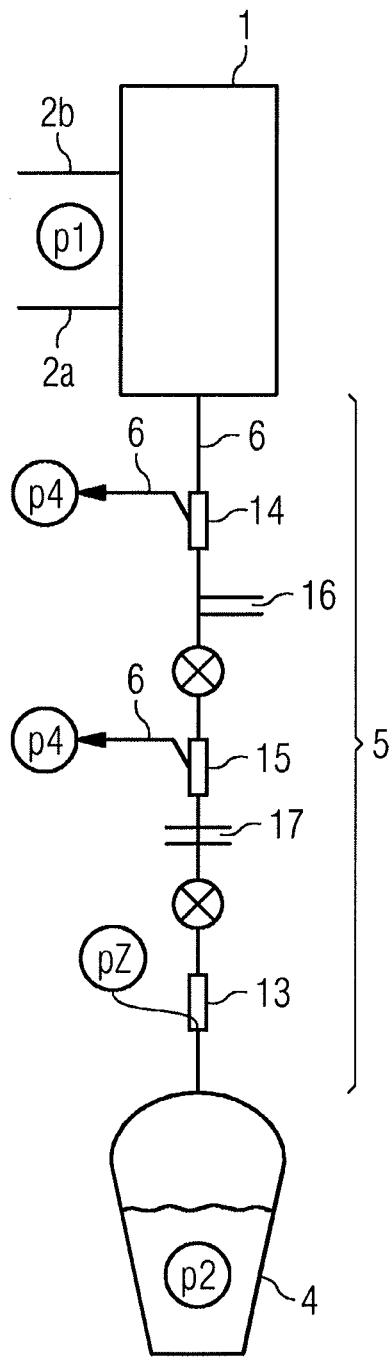
FIGS. 4a and 4b show an embodiment of a device for carrying out a method according to the invention during two working cycles of the method.

FIG. 1 shows a device for carrying out a method according to the invention. This device comprises a reduction shaft 1, a pre-reduction gas supply line 2 discharging into the reduction shaft 1, a top gas discharge line 3 emerging from the reduction shaft 1, a melter gasifier 4, an introduction system 5 for introducing material that is pre-reduced in the reduction shaft 1 into the melter gasifier 4 and a dust exhaust gas discharge line 6 emerging from the reduction shaft 1. In the reduction shaft 1, material containing iron oxide forms a solid bed 7. Pre-reduction gas, which is introduced via the pre-reduction gas supply line 2 into the solid bed 7, is under a pressure p1. The pre-reduction gas converts the material containing iron oxide into pre-reduced material. Pre-reduced material is introduced via the introduction system 5 for introducing material that is pre-reduced in the reduction shaft 1 into the melter gasifier 4. There, it is finally reduced and smelted by means of the reduction gas 8 under a pressure p2—which is generated in the melter gasifier 1 by the gasification of carbon carriers.

After flowing through the solid bed 7, used pre-reduction gas is diverted as top gas having a pressure p3 out of the chamber above the solid bed 7 out of the reduction shaft 1.

A dust exhaust gas having a pressure p4 is diverted from the solid bed 7 out of the reduction shaft 1 via the dust exhaust gas discharge line 6 emerging from the reduction shaft 1. The relationship p1>p4 and p1>p3 applies. p4>p2 and p4>p3 also apply. p1>p2 also applies.

In FIG. 2, p2>p4 applies. The pre-reduced material 9 is brought to an intermediate gas pressure pZ in one step—in the intermediate container 10—before it is introduced into the melter gasifier 4. In this case, pZ≥p2 applies. In FIG. 2, the situation on the introduction of the pre-reduced material in the melter gasifier 4 is depicted by particles falling out of the intermediate container 10 into the melter gasifier 4.

During the feeding (not shown) of pre-reduced material into the intermediate container 10, $pZ=p4<p2$ would apply.

In FIG. 2, the introduction system for introducing material that is pre-reduced in the reduction shaft into the melter gasifier also comprises a part of the dust exhaust gas discharge line 6.

Also depicted are pressure lock devices 16 and 17 before and behind the intermediate container 10 in each case by two horizontal lines on the line of the introduction system 5 connecting the reduction shaft 1 and melter gasifier 4. In the situation depicted in FIG. 2, the pressure lock device 16 in the line 6 connecting the reduction shaft 1 and the intermediate container 10 is closed and the pressure lock device 17 in the line connecting the intermediate container 10 to the melter gasifier 4 is open.

FIG. 3 shows a section of the melter-gasifier-side end region of the reduction shaft 1, a section of the melter gasifier 4, and the introduction system 5 for introducing material that is pre-reduced in the reduction shaft 1 into the melter gasifier 4. The region of the bustle in which the pre-reduction gas supply line 2 discharges into the reduction shaft 1 is visible on the reduction shaft 1. Also visible is a conveyor screw 19 which conveys pre-reduced material from the reduction shaft. The introduction system 5 for introducing material that is pre-reduced in the reduction shaft 1 into the melter gasifier 4 comprises an intermediate container 11. Also depicted is a material cushion 20 comprising pre-reduced material in the intermediate container 11. Between the upper end 21 of the material cushion and the lower end 22 of the material cushion, there is a pressure difference of $\Delta p_{zw}$. The intermediate container 11 is provided with a dust discharge gas discharge line 12. This line is used to discharge dust from the intermediate container 11 by means of a dust discharge gas having a pressure p5, depicted a wavy arrow. Dust exhaust gas, depicted by a straight arrow, is withdrawn under the pressure p4.

$p5<p4$ and $p5<p2$ applies and $\Delta p_{zw}$ smaller than/equal to $(p2-p5)$ applies.

In principle, also possible is an embodiment with which, unlike the case in FIG. 3, one line from the depicted group of lines consisting of the dust exhaust gas discharge line 6 and the dust discharge gas discharge line 12 is not present.

It is, for example, possible that, in contrast to FIG. 3, the dust exhaust gas discharge line 6 plotted next to the conveyor screw is not present. Then, the line emerging from the intermediate container 11 would also be treated as a dust exhaust gas discharge line since it diverts from the solid bed a dust exhaust gas having a pressure—which would be designated p4—from the reduction shaft. The dust discharge gas then comprises the dust exhaust gas, and $p4=p5$ applies.

Or another possible scenario is that dust diversion is implemented in order to discharge dust at any point within the section of the introduction system 5 between the reduction shaft 1 and the intermediate container 11, instead of the dust discharge gas line 12 and the dust exhaust gas discharge line 6 depicted in FIG. 3. Since in this case, the gas removed by this dust diversion diverts the dust removed in FIG. 3 by the dust exhaust gas discharge line 6 and the dust discharge gas discharge line 12 and hence replaces these two lines, $p4=p5$ applies.

Figure 4B:
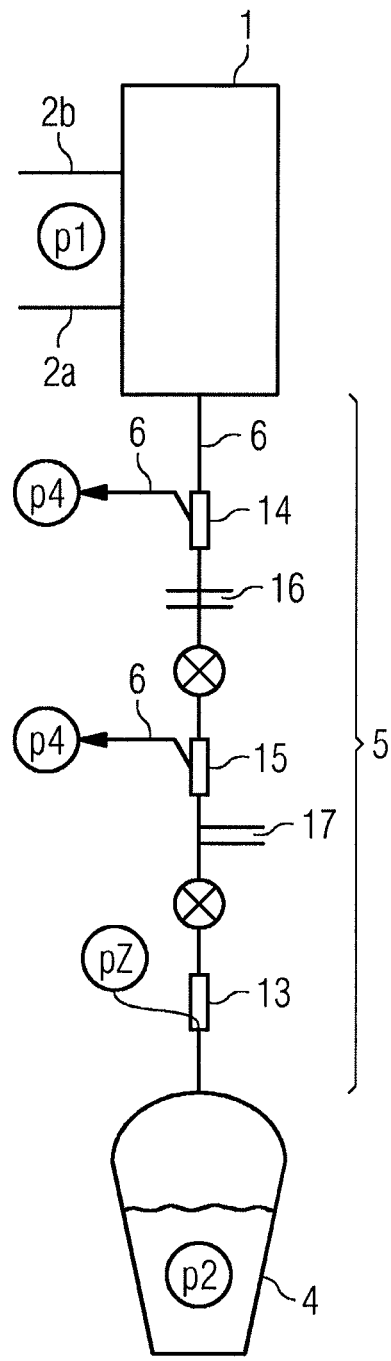

FIGS. 4A and 4B depict how two pre-reduction gas supply lines 2a, 2b discharge into a reduction shaft 1 at different heights. This enables, for example, two reduction gases with different reduction potentials to be introduced, optionally at different pressures.

Also depicted is the fact that the introduction system 5 for introducing material that is pre-reduced in the reduction shaft 1 into the melter gasifier 4 comprises a line with a plurality of intermediate containers and a plurality of pressure lock devices 16 and 17. The pre-reduced material is brought to the intermediate gas pressure pZ prevailing in the last intermediate container 13 before the melter gasifier 4 in that the pre-reduced material is introduced into a plurality of intermediate containers 14,15 with pressure lock devices 16,17 in sequence—depicted in each case by a pair of horizontal lines.

Metering devices are depicted with circles containing crosses.

The introduction system for introducing material that is pre-reduced in the reduction shaft in the melter gasifier also comprises a part of the dust exhaust gas discharge line 6. Further parts of the dust exhaust gas discharge line 6 emerge from the intermediate containers 14 and 15.

The purpose of the three intermediate containers 13,14,15 consists in the fact that, in a first cycle (a)—depicted in FIG. 4a—pre-reduced material from the uppermost intermediate container 14 is fed into the middle intermediate container 15, wherein the material and gas flow between the middle intermediate container 15 and the lower intermediate container 13 is blocked by the pressure lock device 17 and dust is drawn out of the middle intermediate container 15 via the dust exhaust gas discharge line 6 emerging therefrom. After switching to cycle (b)—depicted in FIG. 4b—pre-reduced material is fed from the middle intermediate container 15 into the lower intermediate container 13, wherein the material and gas flow between the upper intermediate container 14 and the middle intermediate container 15 is blocked by the pressure lock device 16 and dust is drawn out of the upper intermediate container 14 via the dust exhaust gas discharge line 6 emerging therefrom; in addition, the upper intermediate container 14 is filled with pre-reduced material from the reduction shaft 1.

Hence, material from the reduction shaft 1 can be continuously discharged and fed into the melter gasifier 4, wherein in this case dust follows the pre-reduced material into the melter gasifier or is discharged by the dust exhaust gas discharge lines 6.

Figure 5:
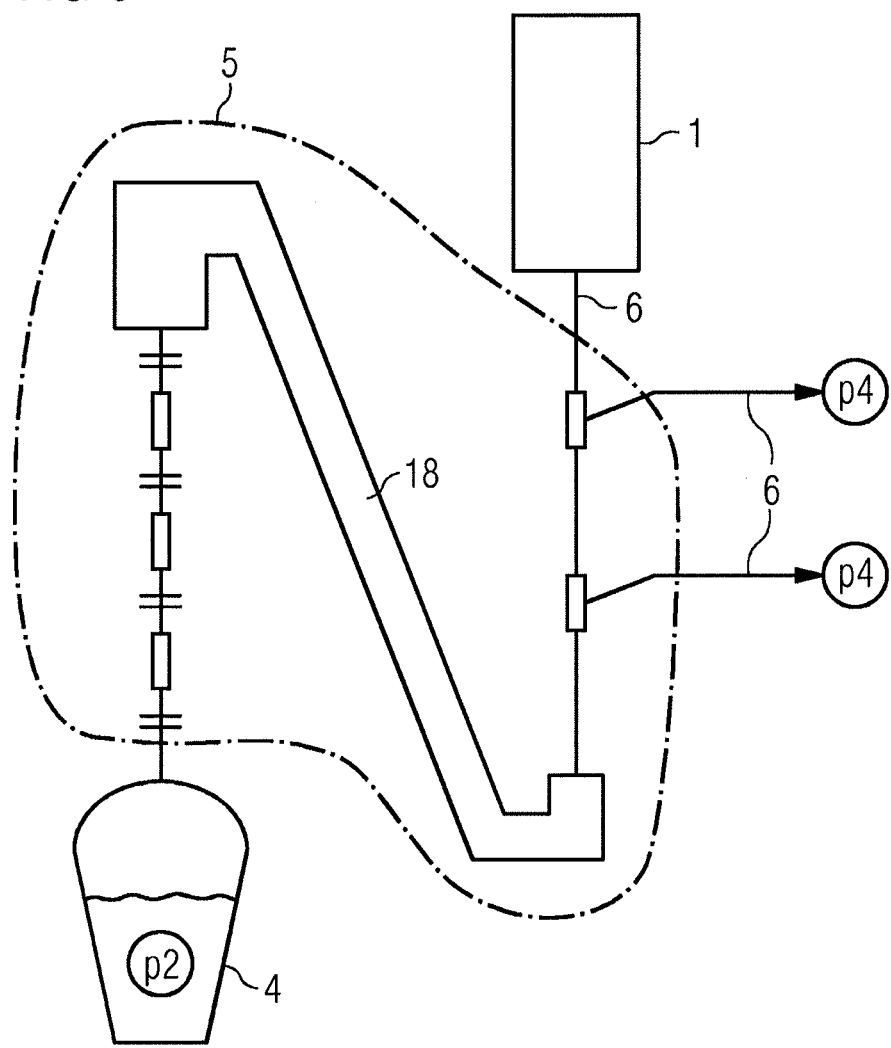
FIG. 5 shows a further preferred embodiment of a device for carrying out a method according to the invention.

FIG. 5 is a schematic depiction of an embodiment, with which the introduction system 5 for introducing material that is pre-reduced in the reduction shaft 1 into the melter gasifier 4 has a different design than in the preceding figures. It comprises a hot transport device 18 with a conveyor belt for conveying hot pre-reduced material under an inert gas atmosphere between two intermediate containers.

In order to set an intermediate container at a specific pressure, it is possible, for example, to introduce a gas into the intermediate container or withdraw gas from the intermediate container. Line systems required to carry out operations of this kind are not shown in the figures for purposes of clarity.

Although the invention was illustrated and described in more detail by the preferred exemplary embodiments, the invention is not restricted by the disclosed examples and other variations can be derived herefrom by the person skilled in the art without departing from the scope of protection of the invention.

LIST OF REFERENCE NUMBERS

1 Reduction shaft
2 Pre-reduction gas supply line
3 Top gas discharge line

4 Melter gasifier
5 Introduction system
6 Dust exhaust gas discharge lines
7 Solid bed
8 Reduction gas
9 Pre-reduced material
10 Intermediate container
11 Intermediate container
12 Dust discharge gas discharge line
13 Intermediate container
14 Intermediate container
15 Intermediate container
16 Pressure lock device
17 Pressure lock device
18 Hot transport device
19 Conveyor screw
20 Cushion of pre-reduced material
21 Upper end of cushion
22 Lower end of cushion

The invention claimed is:

1. A method for reducing material containing iron oxide, comprising:
proving material containing iron oxide for forming a solid bed in a reduction shaft;
converting the material containing iron oxide to pre-reduced material in the reduction shaft by introducing at least one pre-reduction gas into the solid bed at a pressure p1;
also introducing at least a part of the pre-reduced material from the reduction shaft into a melter gasifier and there finally reducing the pre-reduced material by a reduction gas under a pressure p2 formed in the melter gasifier;
diverting a top gas having a pressure p3 out of a chamber above the solid bed in the reduction shaft, the diversion being out of the reduction shaft;
diverting dust exhaust gas having a pressure p4 from the solid bed and out of the reduction shaft;
wherein there are at the reduction shaft relationships p1>p4 and p1>p3; and
guiding at least part of the dust exhaust gas jointly with the pre-reduced material at least along a part of a path traveled by the pre-reduced material on introduction thereof into the melter gasifier from the reduction shaft to the melter gasifier.

2. The method as claimed in claim 1, further comprising, introducing all of the pre-reduced material from the reduction shaft into the melter gasifier.

3. The method as claimed in claim 1, further comprising the relationship p4>p3.

4. The method as claimed in claim 1, further comprising the relationship p4>p2.

5. The method as claimed in claim 4, further comprising the relationship p1>p2.

6. The method as claimed in claim 1, further comprising the relationship p2>p4, and further comprising bringing the pre-reduced material to an intermediate gas pressure pZ in one or more steps before or while the pre-reduced material is introduced into the melter gasifier, and further comprising the relationship pZ≥p2.

7. The method as claimed in claim 6, further comprising temporarily storing the pre-reduced material from the reduction shaft, which is introduced into the melter gasifier, in an intermediate container before its introduction into the melter gasifier, and thereby causing formation in the intermediate container of a pressure difference of $\Delta p_{zw}$ between an upper end of a material cushion formed during the temporary storage and a lower end of the material cushion; and
withdrawing a dust discharge gas having a dust discharge gas pressure p5 from the intermediate container, and further comprising the relationships p5<p4, and p5<p2 and $\Delta p_{zw} \leq (p2-p5)$.

8. The method as claimed in claim 7, wherein the dust discharge gas comprises the dust exhaust gas and further comprising the relationship p4=p5.

9. The method as claimed in claim 6, further comprising bringing the pre-reduced material to the intermediate gas pressure pZ by introducing the pre-reduced material into an intermediate container with pressure lock devices.

10. The method as claimed in claim 6, further comprising bringing the pre-reduced material to the intermediate gas pressure pZ by introducing the pre-reduced material into and out of a plurality of intermediate containers with respective pressure lock devices in sequence into and out of each of the intermediate containers.

11. The method as claimed in claim 1, further comprising:
introducing two or more pre-reduction gases under respective pressures that differ from each other into the solid bed, wherein the two pre-reduction gases are introduced vertically directly adjacent to each other, when viewed in the horizontal direction, and such that the respective pre-reduction gas introduced at a lower level has a higher pressure than the respective pre-reduction gas introduced at a higher level.

* * * * *